(12) United States Patent
Snyder (10) Patent No.: US 6,606,861 B2
(45) Date of Patent: Aug. 19, 2003

(54) LOW EMISSIONS COMBUSTOR FOR A GAS TURBINE ENGINE

(75) Inventor: Timothy S. Snyder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 120 days.

(21) Appl. No.: 09/793,229

(22) Filed: Feb. 26, 2001

(65) Prior Publication Data

US 2002/0116929 A1 Aug. 29, 2002

(51) Int. Cl.$^7$ ................................................. F02C 1/00
(52) U.S. Cl. ............................................. 60/752; 60/804
(58) Field of Search ........................ 60/757, 755, 732, 60/809

(56) References Cited

U.S. PATENT DOCUMENTS

| | | | |
|---|---|---|---|
| 3,735,589 A | 5/1973 | Caruel et al. | ................ 60/757 |
| 4,733,538 A | 3/1988 | Vdoviak et al. | ............... 60/752 |
| 5,758,503 A * | 6/1998 | DuBell et al. | ................ 60/752 |
| 5,934,067 A * | 8/1999 | Ansart et al. | ................. 60/748 |
| 6,101,814 A | 8/2000 | Hoke et al. | ................... 60/752 |
| 6,240,731 B1 * | 6/2001 | Hoke et al. | ................ 239/400 |
| 6,260,359 B1 * | 7/2001 | Monty et al. | ................ 60/732 |

* cited by examiner

Primary Examiner—Charles G. Freay
(74) Attorney, Agent, or Firm—Kenneth C. Baran (57) ABSTRACT

A combustor for a gas turbine engine includes inner and outer liners with a row 112, 114 of dilution air holes penetrating through each liner. The row 114 of holes in the outer liner comprise at least a set of large size, major outer holes 116 and may also include a set of smaller size minor outer holes 118 circumferentially intermediate neighboring pairs of the major outer holes. The row 112 of holes in the inner liner include dilution air holes circumferentially offset from the major outer holes and may also include a set of minor holes 122 circumferentially intermediate major inner holes 120. The major and minor holes admit respective major and minor jets of dilution air into the combustor. The unique distribution of major and minor holes and the corresponding major and minor dilution air jets helps to minimize NOx emissions and regulates the spatial temperature profile of the exhaust gases discharged from the combustor.

5 Claims, 5 Drawing Sheets

LOW EMISSIONS COMBUSTOR FOR A GAS TURBINE ENGINE

TECHNICAL FIELD

This invention relates to combustors for gas turbine engines and particularly to a combustor that reduces emissions of oxides of nitrogen (NOx) and whose exhaust gases have a prescribed spatial temperature profile.

BACKGROUND OF THE INVENTION

Gas turbine engines, such as those used to power modern commercial aircraft, include a compressor for pressurizing a supply of air, a combustor for burning a hydrocarbon fuel in the presence of the pressurized air, and a turbine for extracting energy from the resultant combustion gases. The combustor typically comprises radially spaced apart inner and outer liners. The liners define an annular combustion chamber that resides axially between the compressor and the turbine. Arrays of circumferentially distributed combustion air holes penetrate each liner at multiple axial locations to admit combustion air into the combustion chamber. A plurality of circumferentially distributed fuel injectors projects into the forward end of the combustion chamber to supply the fuel.

Combustion of the hydrocarbon fuel inevitably produces a number of pollutants including oxides of nitrogen (NOx). NOx emissions are the subject of increasingly stringent controls by regulatory authorities. Accordingly, engine manufacturers strive to minimize NOx emissions.

A principal strategy for minimizing NOx emissions is referred to as rich burn, quick quench, lean burn (RQL) combustion. The RQL strategy recognizes that the conditions for NOx formation are most favorable at elevated combustion flame temperatures, i.e. when the fuel-air ratio is at or near stoichiometric. A combustor configured for RQL combustion includes three serially arranged combustion zones: a rich burn zone at the forward end of the combustor, a quench or dilution zone axially aft of the rich burn zone, and a lean burn zone axially aft of the quench zone.

During engine operation, a portion of the pressurized air discharged from the compressor enters the rich burn zone of the combustion chamber. Concurrently, the fuel injectors introduce a stoichiometrically excessive quantity of fuel into the rich burn zone. The resulting stoichiometrically rich fuel-air mixture is ignited and burned to partially release the energy content of the fuel. The fuel rich character of the mixture inhibits NOx formation in the rich burn zone by suppressing the combustion flame temperature and also resists blowout of the combustion flame during any abrupt reduction in engine power.

The fuel rich combustion products generated in the rich burn zone then enter the quench zone where the combustion process continues. Jets of pressurized air from the compressor enter the combustion chamber radially through combustion air holes. The air mixes with the combustion products entering the quench zone to support further combustion and release additional energy from the fuel. The air also progressively deriches the fuel rich combustion products as they flow axially through the quench zone and mix with the air. Initially, the fuel-air ratio of the combustion products changes from fuel rich to stoichiometric, causing an attendant rise in the combustion flame temperature. Since the quantity of NOx produced in a given time interval increases exponentially with flame temperature, substantial quantities of NOx can be produced during the initial quench process.

As the quenching continues, the fuel-air ratio of the combustion products changes from stoichiometric to fuel lean, causing an attendant reduction in the flame temperature. However, until the mixture is diluted to a fuel-air ratio substantially lower than stoichiometric, the flame temperature remains high enough to generate considerable quantities of NOx.

Finally, the derived combustion products from the quench zone flow axially into the lean burn zone where the combustion process concludes. Additional jets of compressor discharge air are admitted radially into the lean burn zone. The additional air supports ongoing combustion to release energy from the fuel and regulates the peak temperature and spatial temperature profile of the combustion products. Regulation of the peak temperature and temperature profile protects the turbine from exposure to excessive temperatures and excessive temperature gradients.

Because most of the NOx emissions originate during the quenching process, it is important for the quenching to progress rapidly, thus limiting the time available for NOx formation. It is also important that the fuel and air become intimately intermixed, either in the quench zone itself or in the forwardmost region of the lean burn zone. Otherwise, even though the mixture flowing through the lean burn zone may be stoichiometrically lean overall, it will include localized pockets where the fuel-air ratio is stoichiometrically rich. The fuel rich pockets can arise for a number of reasons, among them injudicious sizing, distribution or density of the combustion air holes in the liners, or local disparities in the supply pressure driving the air jets. These factors can contribute to poor mixing by inhibiting radial penetration of the air jets and/or by limiting the circumferential coverage afforded by the air jets. Because of their elevated fuel-air ratio, the fuel rich pockets will burn hotter than the rest of the mixture, thereby promoting additional NOx formation and generating local "hot spots" or "hot streaks" that can damage the turbine.

SUMMARY OF THE INVENTION

It is, therefore, a principal object of the invention to inhibit NOx formation in a gas turbine engine combustor and to do so in a way that produces a favorable temperature profile in the combustion gases flowing from the combustor into the turbine.

According to one aspect of the invention, a gas turbine engine annular combustor includes radially inner and outer liners each having a row of circumferentially distributed combustion air holes penetrating therethrough. The row of holes in the radially outer liner includes large size, major holes and may also include smaller size minor holes circumferentially intermediate neighboring pairs of the major holes. The major holes encourage "major" jets of combustion air to penetrate radially inwardly a substantial distance toward, and typically beyond, the radial meanline of the combustion chamber annulus. The minor holes, if present, admit "minor" jets of combustion air that penetrate radially inwardly a smaller distance than the major jets. The minor jets compensate for any inability of the major jets to spread out laterally (i.e. circumferentially). The holes in the inner liner are circumferentially offset from the major holes of the outer liner. The holes of the inner liner encourage jets of combustion air to penetrate radially outwardly a substantial distance toward, and typically beyond, the radial meanline of the combustion chamber annulus, thus admitting combustion air into sectors of the combustion chamber circumferentially intermediate the major outer jets. This distribution of inner and outer holes ensures a thoroughly blended, regularly distributed fuel-air mixture and thus minimizes NOx formation and contributes to a favorable temperature profile of the combustion gases entering the turbine.

According to a second aspect of the invention, the outer and inner liners each have exactly one row of combustion air holes. Each row includes both large size major holes and smaller size minor holes. In the outer row, the minor holes are circumferentially intermediate the major holes. The major holes of the inner row are circumferentially offset from the major holes of the outer row. The minor inner holes admit air jets of combustion air into the sectors of the combustion chamber circumferentially intermediate the major inner jets and radially inboard of the major outer jets.

According to a third aspect of the invention a gas turbine engine combustor includes radially outer and inner liners each having exactly one row of dilution air holes. The outer row comprises major holes and minor holes circumferentially intermediate neighboring pairs of the major holes. The inner liner has dilution air holes circumferentially offset from the major outer holes. A combustor front end assembly serves as the exclusive vehicle for introducing primary combustion air into the combustion chamber, thus ensuring optimum performance of the combustor's rich burn zone.

A fourth aspect of the invention is similar to the third aspect, but includes, in the inner liner, smaller size minor inner holes intermediate pairs of the major inner holes.

The principal advantage of the invention is its ability to curtail NOx emissions while presenting a favorable combustion gas temperature profile to the turbine.

The features, operation and advantages of the inventive combustor will become more evident in view of the following description of the best mode for carrying out the invention and the accompanying drawings.

BEST MODE FOR CARRYING OUT THE INVENTION

Figure 1:
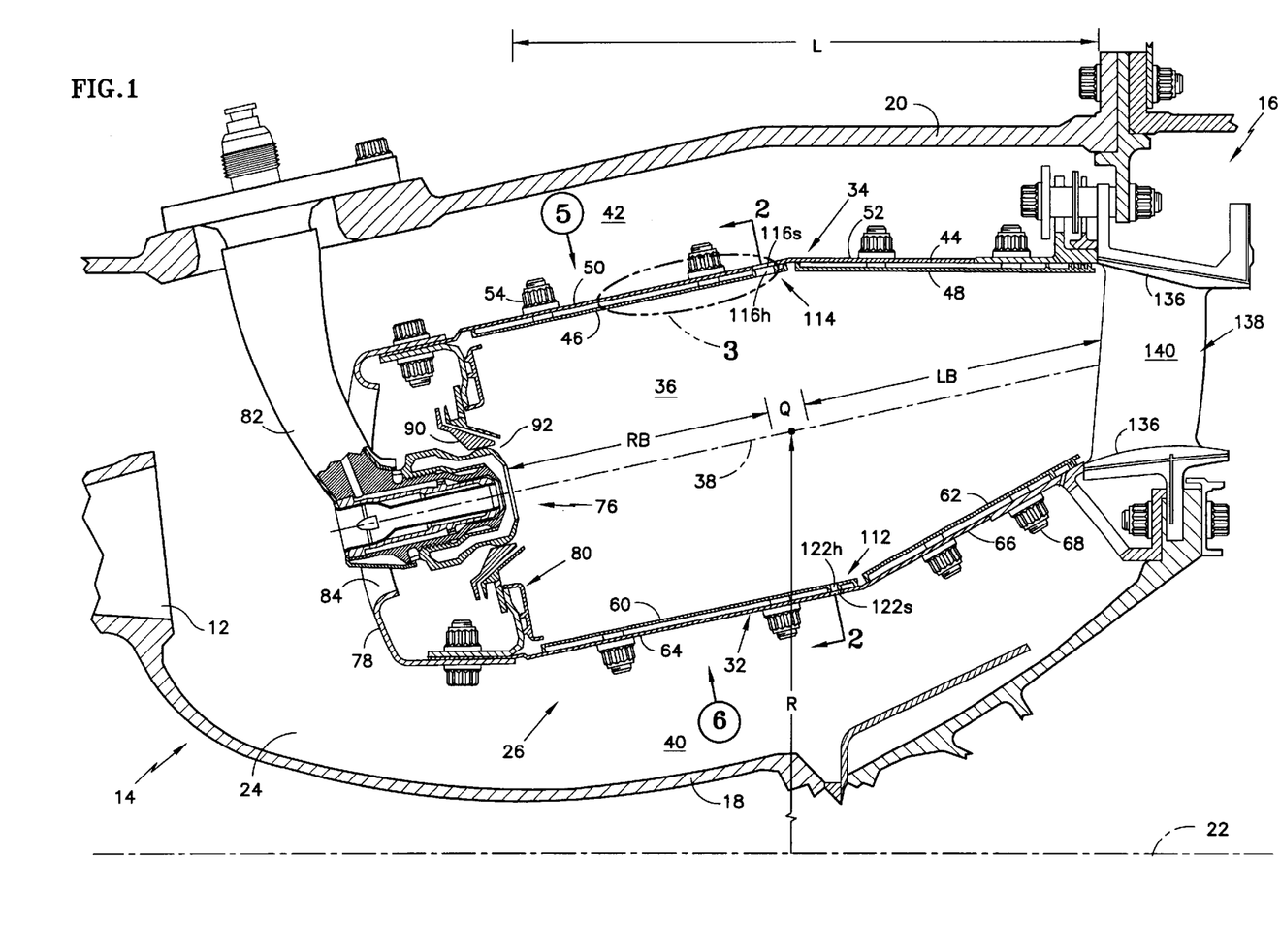
FIG. 1 is a cross-sectional side elevation view of a combustor according to the present invention.

Referring to FIG. 1, the components of a conventional gas turbine engine include a compressor, not shown, a diffuser 12 (partially shown) a combustor module 14, and a turbine module 16 (partially shown). The combustor module comprises a radially inner case 18 and a radially outer case 20, concentric with the inner case. The inner and outer cases circumscribe an axially extending engine centerline 22 to define an annular pressure vessel 24. The module also includes a combustor 26 residing within the annular pressure vessel 24. The combustor 26 includes a liner assembly with an axial length L. The liner assembly comprises a radially inner liner 32 and a radially outer liner 34 that circumscribes the inner liner to define an annular combustion chamber 36. The combustion chamber has a radial meanline 38 spaced a distance R of about 27.2 centimeters (10.7 inches) from the engine centerline 22. The liners 32, 34 cooperate with cases 18, 20 to define respective inner and outer air plenums 40, 42.

Figure 2:
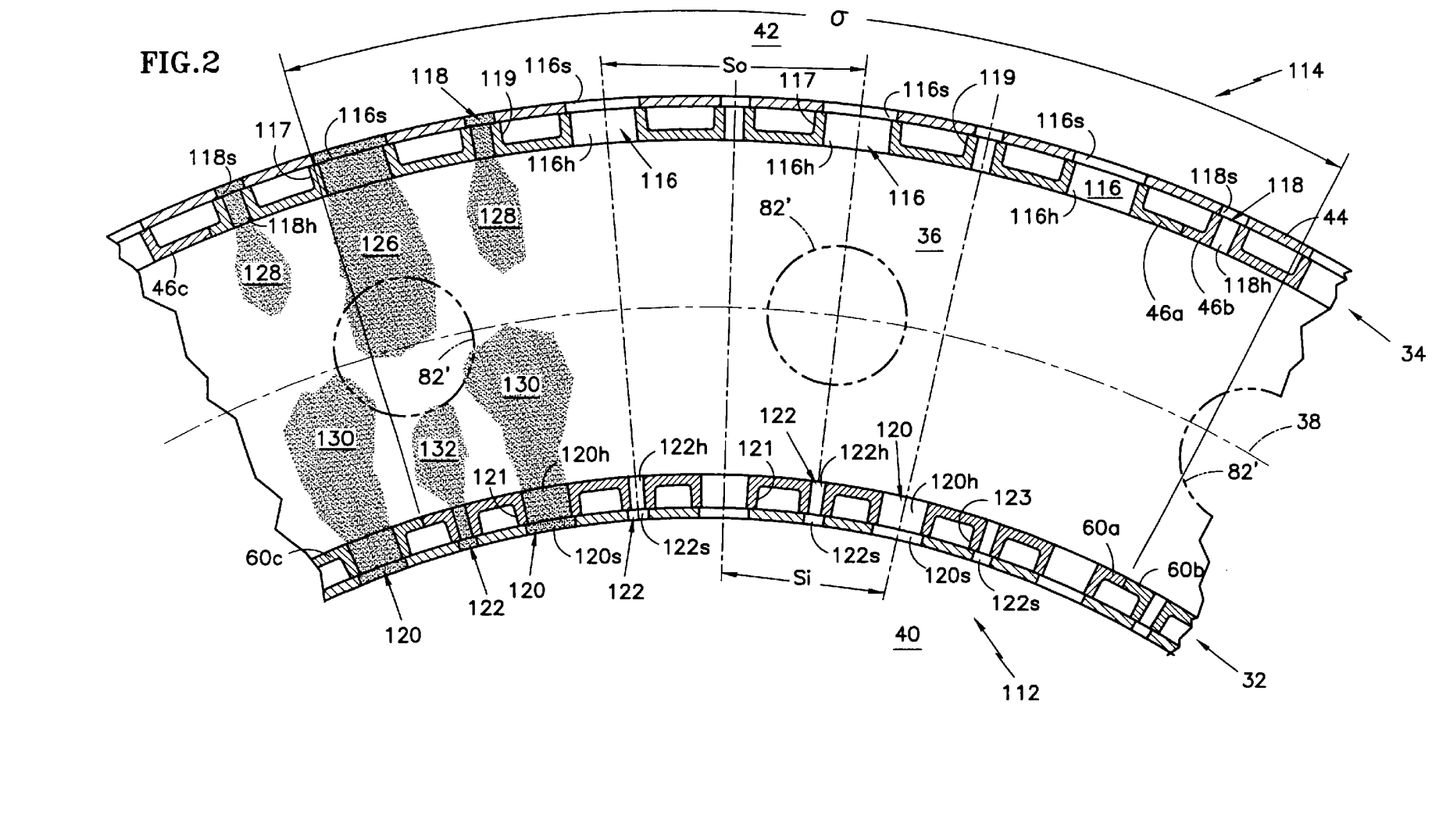
FIG. 2 is a view taken substantially in the direction 3—3 of FIG. 1.

The outer liner 34 comprises a single piece outer support shell 44 connected to the outer case 20, and forward and aft outer heatshields 46, 48 secured by fasteners 54 to respective forward and aft portions 50, 52 of the outer shell. As seen best in FIG. 2, each outer heatshield comprises nine arcuate heatshield panels, such as representative panels 46a, 46b, 46c each subtending an arc σ of approximately 40°. Similarly, the inner liner 32 comprises a single piece inner support shell 58 connected to the inner case 18, and forward and aft inner heatshields 60, 62 secured by fasteners 68 to respective forward and aft portions 64, 66 of the inner shell. As seen best in FIG. 2 each inner heatshield comprises nine arcuate heatshield panels, such as panels 60a, 60b, 60c each subtending an arc σ of approximately 40°. The radial separation between each shell and its respective heatshield panels is slightly exaggerated in FIG. 2 to enhance the clarity of the illustration.

Figures 3A, 3B:
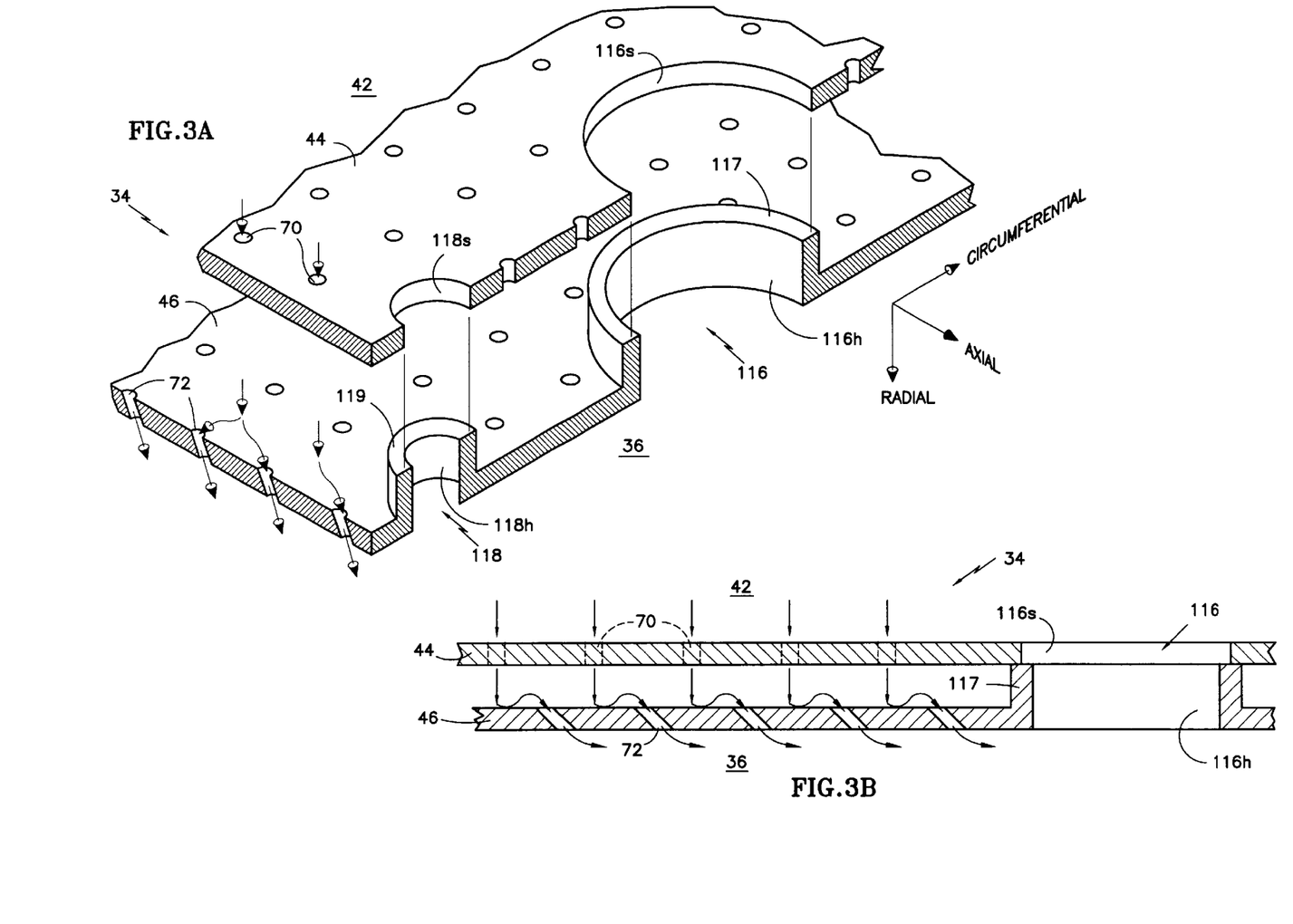
FIG. 3A is an exploded, enlarged perspective view of a portion of the combustor shown in FIG. 1.
FIG. 3B is an enlarged side elevation view of a portion of the combustor shown in FIG. 1.

A plurality of axially and circumferentially distributed cooling air holes perforates the inner and outer liners. These cooling air holes, which are depicted only in FIGS. 3A and 3B, include a plurality of impingement cooling holes 70 penetrating transversely through the support shells 44, 58, and a plurality of film cooling holes 72 penetrating obliquely through the heatshields 46, 48, 60, 62. The cooling air holes 70, 72 are readily distinguishable from combustion air holes described hereinafter because the cooling air holes are far more numerous and substantially smaller than the combustion air holes. For example, the illustrated combustor has a total of approximately 23,000 impingement holes, each about 0.64 millimeters (0.025 inches) in diameter, and a total of approximately 46,000 film cooling holes, each about 0.64 millimeters (0.025 inches) in diameter in the combustor's full complement of thirty-six heatshield panels. Moreover, as described below, the cooling air discharged through holes 72 hugs the heatshield panels to form a cooling film rather than penetrating into the interior of the combustion chamber 36 and participating in the combustion process.

During engine operation, pressurized cooling air from plenums 40, 42 enters the impingement cooling holes 70. The cooling air exits the holes 70 as a first series of discrete jets that impinge on and cool the heatshields. The impinged cooling air then flows through the film cooling holes 72, which discharge a second series of cooling air jets into the combustion chamber. Because the film cooling holes 72 are obliquely oriented, the second cooling air jets enter the combustion chamber with a directional component that parallels the flame exposed surface of each heatshield. The parallelism helps the cooling air jets coalesce into a cooling film that hugs the flame exposed surfaces of the heatshields. The illustrated holes 72 are oriented so that the cooling air discharged therefrom has both radial and axial directional components, however, the holes may be oriented so that the discharged cooling air has a circumferential directional component as well. A ring of film starter holes 74a, 74b, seen most clearly in FIG. 4, penetrates the forward end of each support shell 44, 58 to initially establish the cooling film at the forwardmost extremities of the respective forward heatshields 46, 60. Additional disclosure regarding a similar shell and panel arrangement is contained in U.S. Pat. No. 5,758,503, the contents of which are incorporated herein by reference.

Figure 4:
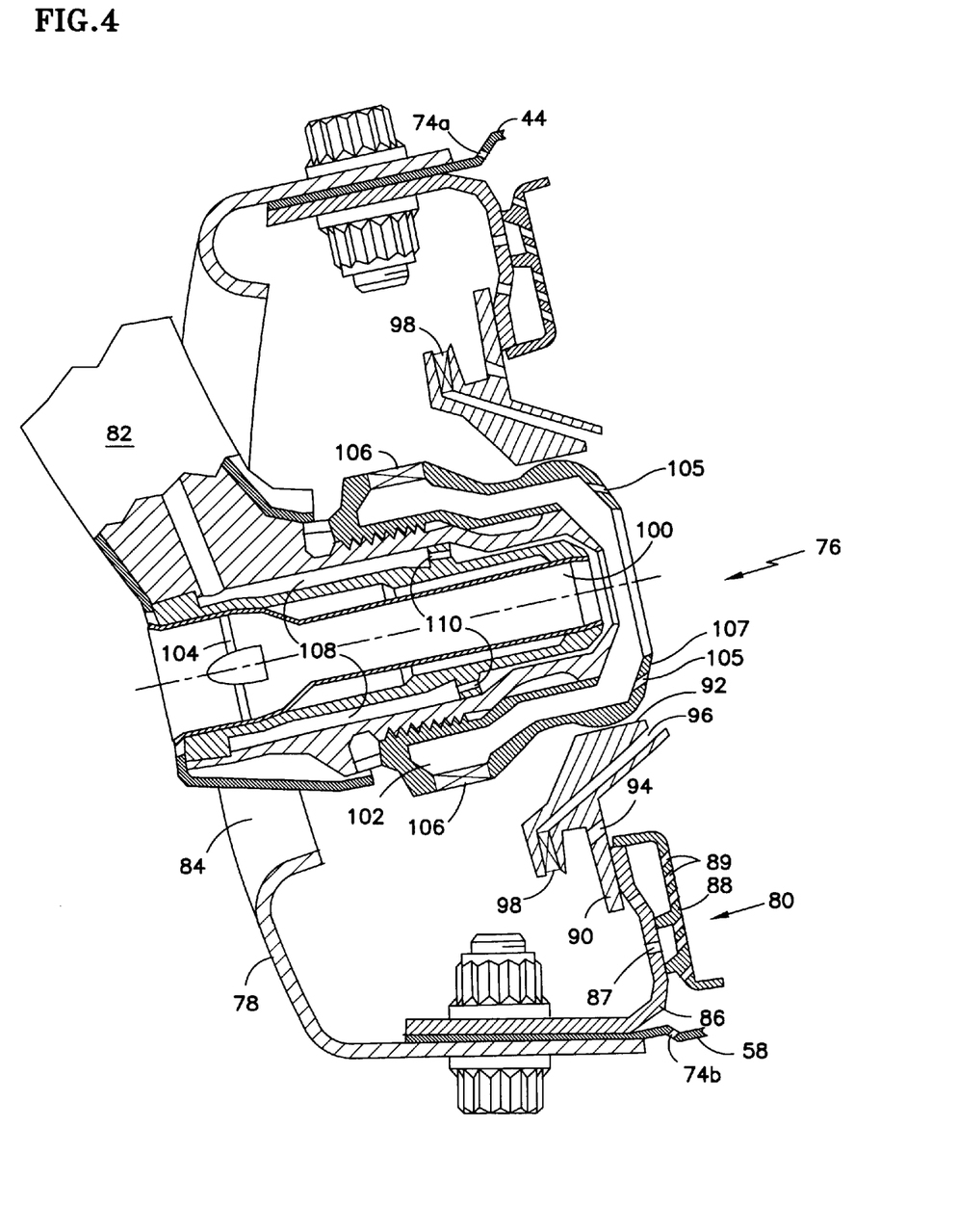
FIG. 4 is an enlargement of the forwardmost portion of the combustor of FIG. 1.

Referring principally to FIGS. 1 and 4, the combustor also includes a front end assembly 76 comprising an annularly extending hood 78, a bulkhead assembly 80, eighteen fuel injectors 82 and eighteen fuel injector guides 90. As described in more detail below, the front end assembly is the exclusive vehicle for introducing primary combustion air into the forward end of the combustion chamber 36.

The hood 78 extends radially between and is secured to the forwardmost ends of the inner and outer liners 32, 34. The hood includes eighteen circumferentially distributed hood ports 84 that accommodate the fuel injectors and introduce air into the forward end of the combustion chamber.

Each bulkhead assembly 80 includes a bulkhead that comprises an annularly extending bulkhead support shell 86 secured to the inner and outer liners and eighteen circumferentially distributed bulkhead heatshields segments 88 secured to the bulkhead support shell 86. The eighteen fuel injector guides 90, each with a central opening 92 circumferentially aligned with one of the hood ports 84, project through the bulkhead. Purge air passages 94 and swirl air passages 96 extend through the guide 90. A guide air swirler 98 resides in the upstream end of each swirl air passage. Cooling air passages 87, 89 perforate the bulkhead support shell 86 and the bulkhead heatshield 88.

Each fuel injector 82 is secured to the outer case and projects through one of the hood ports 84 and through the central opening 92 in the corresponding fuel injector guide 90. Each fuel injector 82 includes an inner air passage 100 and an annular outer air passage 102 each having respective inner and outer air swirlers 104, 106 residing therein. Cooling air holes 105 penetrate through lip 107 of the injector. The holes 105 divert some of the air from passage 102 into the region of the combustion chamber immediately aft of the injector lip to shield the lip from the intense heat of the combustion flame. The holes 105 are oriented so that the air issuing from the holes has both radial and circumferential directional components. Each injector also includes an annular fuel injection passage 108 for introducing a hydrocarbon fuel into the combustion chamber 36. A ring of obliquely oriented, discrete swirl passages 110 resides in the fuel passage to impart swirl to the fuel. The air passages 94, 96, 100, 102 and fuel passage 108 are carefully arranged and oriented to produce a swirling, intimately blended fuel-air mixture that supports combustion in the front end of the combustion chamber.

Referring primarily to FIGS. 1, 2, 5 and 6, the inner and outer liners each have a row 112, 114 of circumferentially distributed combustion air admission holes penetrating therethrough. The row 114 of combustion air holes in the outer liner includes at least a set of equiangularly distributed, large size major holes or passages 116. Non-neighboring major holes are each circumferentially aligned with one of the fuel injectors 82, projections of which are designated 82' in FIG. 2. The major holes 116 are circular holes, each comprising a hole 116s in the outer shell 44 and a corresponding hole 116h in the forward outer heatshield 46. A raised rim 117, integral with the heatshield, circumscribes each hole 116h and occupies the radial space between the heatshield and the shell so that each hole 116 is in the form of a short, sealed passage for conveying combustion air from the plenum 42 to the combustion chamber 36. The holes 116s are circular holes, each having a diameter of about 19.3 millimeters (0.76 inches). The holes 116h are also circular holes, each having a diameter of the about 17.3 millimeters (0.68 inches). The holes 116s are slightly larger than holes 116h to account for manufacturing and assembly inaccuracies that might otherwise result in imperfect registration of the holes 116s, 116h and attendant, undesirable restriction of fluid flow through the holes 116. Owing to their smaller size, the holes 116h, rather than holes 116s, regulate the quantity of combustion air admitted into the combustion chamber 36.

Figure 5:
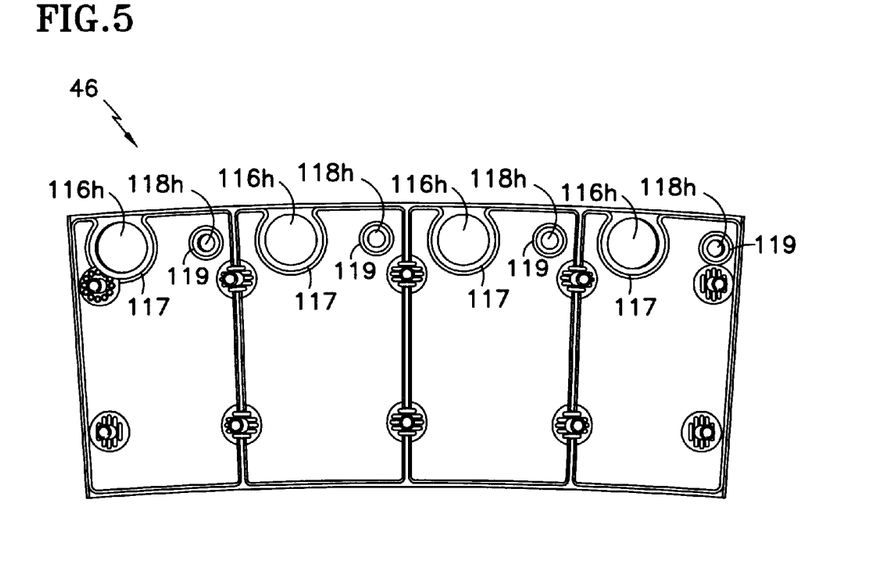
FIG. 5 is a plan view of a representative, radially outer heatshield panel of the present invention viewed from the side of the panel not exposed to the combustion flame, i.e. in direction 5 of FIG. 1.

Ideally, the outer liner also includes a set of smaller size, minor combustion air holes 118, the minor holes residing circumferentially intermediate neighboring pairs of the major outer holes. The minor holes are circular holes, each comprising a hole 118s in the outer shell 44 and a corresponding hole 118h in the heatshield 46. A raised rim 119, integral with the heatshield, circumscribes each hole 118h and occupies the radial space between the heatshield and the shell so that each hole 118 is in the form of a short, sealed passage for conveying combustion air from the plenum 42 to the combustion chamber 36. The holes 118s are circular holes, each having a diameter of about 7.1 millimeters (0.28 inches). The holes 118h are also circular holes, each having a diameter of about 5.1 millimeters (0.20 inches). The quantity of minor outer holes 118 need not equal the quantity of major outer holes 116. However, in the illustrated embodiment there are an equal number of major and minor outer holes (36 of each) so that the outer row 114 comprises circumferentially alternating, equiangularly distributed major and minor holes.

Figure 6:
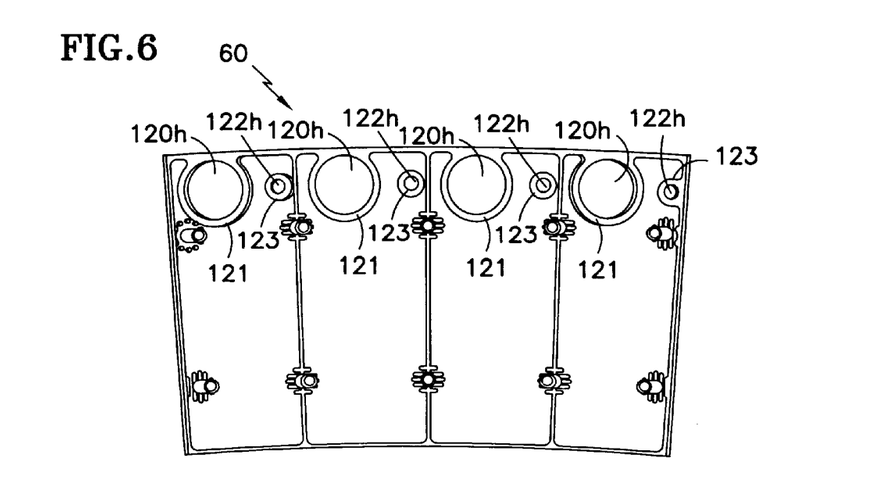
FIG. 6 is a plan view of a representative, radially inner heatshield panel of the present invention viewed from the side of the panel not exposed to the combustion flame, i.e. in direction 6 of FIG. 1.

The row 112 of holes in the inner liner includes at least a set of equiangularly distributed holes 120, each circumferentially offset from the major outer holes 116. In the illustrated embodiment, the inner row 112 includes large size major inner holes 120 circumferentially offset from the major outer holes 116, as well as smaller size minor inner holes 122 residing circumferentially intermediate the major inner holes 120. The major holes 120 are circular holes each comprising a hole 120s in the inner shell 58 and a corresponding hole 120h in the forward inner heatshield 60. A raised rim 121, integral with the heatshield, circumscribes each hole 120h and occupies the radial space between the inner heatshield and the inner support shell so that each hole 120 is in the form of a short, sealed passage for conveying combustion air from the inner plenum 40 to the combustion chamber 36. The holes 120s are circular holes, each having a diameter of about 18.8 millimeters (0.74 inches). The holes 120h are also circular holes, each having a diameter of the about 16.8 millimeters (0.66 inches).

The minor holes 122 are circular holes each comprising a hole 122s in the inner shell 58 and a corresponding hole 122h in the inner heatshield 60. A raised rim 123, integral with the heatshield, circumscribes each hole 122h and occupies the radial space between the inner heatshield and the inner support shell so that each hole 122 is in the form of a short, sealed passage for conveying combustion air from the inner plenum 40 to the combustion chamber 36. The holes 122s are circular holes, each having a diameter of about 5.8 millimeters (0.23 inches). The holes 122h are also circular holes, each having a diameter of the about 3.8 millimeters (0.15 inches). The quantity of minor inner holes need not equal the quantity of major inner holes. However, in the illustrated embodiment there are an equal number of major and minor inner holes (36 of each) so that the inner row 112 comprises circumferentially alternating major and minor holes. Each major inner hole radially opposes a minor outer hole and each minor inner hole radially opposes a major outer hole.

The inner and outer rows 112, 114 of combustion air holes are approximately axially aligned with each other and penetrate their respective liners 32, 34 no further aft than about midway along the axial length L of the liner assembly. In the illustrated embodiment, each row 112, 114 penetrates its respective liner at about midway along the axial length L of the liner assembly, which corresponds to a location proximate the trailing edge of each forward heatshield 46, 60. The rows 112, 114 of holes divide the combustion chamber into three combustion zones, a rich burn zone RB axially forward of the holes, a dilution or quench zone Q axially coincident with the holes, and a lean burn zone LB axially aft of the holes.

In operation, the diffuser 12 decelerates pressurized air flowing from the compressor, not shown. A first portion of the pressurized air enters the combustor by way of the impingement and film cooling holes 70, 72, 74a, 74b to cool the heatshields 46, 48, 60, 62 and by way of the cooling holes 87, 89 to cool the bulkhead assembly 80 as described above. A second portion of the pressurized air enters the rich burn zone RB of the combustion chamber 36 by way of passages 94, 96, 100, 102 in the front end assembly 76. This air is referred to as primary combustion air because it intermixes with a stoichiometrically excessive quantity of fuel introduced through the fuel injectors to support initial combustion in the rich burn zone. The rich stoichiometry of the fuel-air mixture in the rich burn zone produces a relatively cool flame, thus preventing excessive NOx formation and guarding against blowout of the combustion flame during any abrupt reduction in engine power. In the inventive combustor, the front end assembly is the exclusive vehicle for introducing primary combustion air into the combustion chamber. This is advantageous because introducing the primary air elsewhere, e.g. through combustion air openings in the forward end of the inner and outer liners, would provoke excessive NOx formation by producing stoichiometrically or nearly stoichiometrically proportioned pockets of fuel and air in the forward end of the combustion chamber.

The combustion products from the rich burn zone, which include unburned fuel, then enter the quench zone Q. A third portion of the pressurized air from the compressor flows from plenums 40, 42 and into the quench zone through the rows 112, 114 of combustion air holes. This third portion of pressurized air is referred to as dilution air because its purpose is to dilute or derich the combustion products from their stoichiometrically rich state at the forward edge of the quench zone to a stoichiometrically lean state at or just downstream of the aft edge of the quench zone. It is also important for the dilution air to intermix intimately with the combustion products flowing through the combustion chamber so that the fuel-air mixture quickly becomes both thoroughly blended and regularly distributed. As used herein, the term "regular" refers to a state in which the fuel-air ratio is substantially uniform in the circumferential direction (at any arbitrarily specified radius) and in which the radial distribution of fuel-air ratio is either uniform or varies in a desired, preestablished way.

Major outer jets 126 of combustion air enter the combustion chamber through the major outer holes 116 and penetrate radially inwardly while also being swept axially downstream into the rich burn zone by the combustion products flowing through the combustor. By the time the jets 126 have been swept downstream a distance of one or two hole diameters, they will have penetrated beyond the combustion chamber radial meanline 38. In the preferred embodiment, minor outer jets 128 of air enter the combustion chamber through minor outer holes 118. The minor jets of air help to dilute or quench the fuel-air mixture in the sectors of the combustion chamber circumferentially intermediate the major outer jets, particularly in a region radially outboard of the combustion chamber radial meanline 38. The minor outer holes are present in the preferred embodiment because the linear separation $S_o$ between the major outer holes, and therefore between the major outer jets, is relatively large. Moreover, the major outer jets 126 are highly cohesive in the vicinity of the liner since, within the quench zone Q, they will not have penetrated radially far enough to be dispersed by and become intermixed with the combustion products flowing axially through the combustor. Both of these factors, the large circumferential separation and the cohesiveness of the jets, may inhibit the ability of the major jets 126 to quickly spread out laterally (circumferentially) into the sectors of the combustion chamber circumferentially intermediate the major outer holes 116. The minor jets 128 help to admit dilution air into these sectors. By design, the minor jets penetrate only a limited radial distance because the major jets converge toward each other and spread out laterally as they approach the inner liner 32. Moreover, the major outer jets are augmented by minor inner jets as described in more detail below.

The holes 120 of the inner liner also admit jets 130 of combustion air to dilute or quench the fuel-air mixture in the combustion chamber sectors circumferentially intermediate the major outer jets 126. By the time the jets 130 have been swept downstream a distance of one or two hole diameters, they will have penetrated beyond the combustion chamber radial meanline 38. Because the linear separation $S_r$ between the major inner holes 120 is appreciably smaller than the separation $S_o$ between the major outer holes, the air jets 130 may be better able than the major outer jets 126 to spread out laterally into the sectors of the combustion chamber circumferentially intermediate the holes 120. Nevertheless, the inner liner of the illustrated embodiment includes minor holes 122 in addition to major holes, 120. The minor inner holes 122 admit minor inner air jets 132 that admit dilution air into the sectors between the major jets 130 and radially inboard of major jets 126.

Each minor jet 128, 132 also cooperates with its opposing major jet 130, 126 to ensure that dilution air spans radially across the entire combustion chamber annulus. Because each minor jet 128, 132 penetrates radially only a limited distance, each jet also helps to cool respective heatshield 48, 62.

The penetration depth of the major and minor jets, and the corresponding quantity of air admitted through the major and minor holes, may be regulated by specifying the relative sizes of the holes 116, 118, 120, 122 since the penetration depth of the jets and the fluid admission capacity of the holes both increase with increasing hole size. As a result, the combustion chamber designer is able to adjust the temperature profile of the combustion gases, preferably by adjusting the size of the large holes 116, 120, without compromising fuel-air mixing, which could lead to elevated levels of NOx. In the most preferred embodiment, which includes circumferentially alternating major and minor holes in both the inner and outer liners, the holes are sized so that the major holes 116, 120 admit at least about 90% of the total dilution air and preferably about 94% of the dilution air. The minor holes 118, 122 admit no more than about 10% of the total combustion air and preferably about 6% of the dilution air.

Finally, the combustion products from the quench zone enter the lean burn zone LB where the combustion process concludes. As the combustion products flow into the lean burn zone, the air jets 126, 128, 130, 132 are not only swept downstream, but also continue to penetrate radially and spread out laterally and intermix thoroughly with the combustion gases.

The circumferential distribution and axial alignment of the inner and outer rows 112, 114 of holes not only mitigates NOx formation as described above, but also adjusts the peak temperature and spatial temperature profile of the exhaust gases entering the turbine module 16. Use of the quench zone air to adjust the exhaust gas temperature profile is superior to the traditional practice of using a dedicated set of profile control holes near the aft end of the combustor because the quantity of air available for both dilution and profile control is limited. Any air used for both dilution and profile control near the aft end of the combustor would be unavailable to serve as dilution air in the quench zone. As a result, the fuel-air mixture exiting the quench zone could be rich enough to continue producing appreciable quantities of NOx.

The prescribed temperature profile may be spatially uniform if desired, however in the illustrated, preferred embodiment the profile is radially nonuniform, being coolest near the liners 32, 34 and hottest in the vicinity of the combustor radial meanline 38. The radially nonuniform profile is beneficial because the circumferentially extending platforms 136 at the radially inner and outer extremities of first stage turbine vanes 138 are inherently more difficult to cool than is the airfoil 140 that extends radially between the platforms. Accordingly, it is advantageous to subject the platforms to a lower temperature than the airfoil.

With the best mode for carrying out the invention and the operation thereof having been described, certain additional features and benefits of the invention can now be more readily appreciated.

In the illustrated embodiment, only one row of combustion air holes penetrates each of the liners 32, 34. As a result, admission of dilution air occurs over a very limited axial distance, thus limiting the distance over which the fuel-air ratio is at or near stoichiometric and the time interval during which the flame temperature is hot enough to produce appreciable quantities of NOx. In principle, multiple rows of dilution holes could be employed. However, in order to confine multiple rows of holes to the same limited axial distance as the single row of holes shown in the illustrated embodiment, the holes of those multiple rows would have to be smaller in size than the illustrated holes. As a result, the combustion air jets admitted through those holes would not penetrate radially inwardly or outwardly far enough to produce a spatially regular, intimately mixed blend of fuel and air. The resultant spatial irregularity of the mixture would compromise the NOx reduction potential of the combustor and, because of its correspondingly irregular temperature profile, would subject the turbine module to excessive exhaust gas temperatures and/or excessive temperature gradients.

The illustrated embodiment includes both major and minor holes in both the inner and outer liners. Although one could attempt to employ uniformly sized holes (smaller than the illustrated major holes and larger than the illustrated minor holes) the air jets admitted by such holes would penetrate radially a smaller distance than the air jets admitted by the illustrated major holes. Such limited penetration could result in a spatially irregular fuel-air mixture with attendant excessive NOx production and hot spots in the vicinity of the radially opposing liner.

The axial location of the rows 112, 114 of air admission holes is selected to harmonize the competing considerations of optimizing the spatial temperature profile of the combustion products and preventing excessive NOx formation in the rich burn zone upstream of the holes. The hole rows are positioned far enough forward to ensure that the air jets 126, 128, 130, 132 have enough axial distance and ample time to adjust the temperature profile of the combustion gases before those gases enter the turbine module 16. The hole rows are also positioned far enough aft to prevent the dilution air from being entrained into the fuel-air mixture immediately aft of the fuel injectors 82. Such entrainment would increase NOx emissions and degrade combustor blowout resistance by deriching the fuel-air mixture in the rich burn zone.

Evaluations using sophisticated computational fluid dynamics (CFD) techniques has shown the efficacy of the inventive combustor, particularly those embodiments that include the minor outer holes 116. For example, evaluations of combustor configurations having both major and minor holes 116, 118 in the outer liner and having at least major holes 120 in the inner liner were predicted to produce approximately 25% less NOx than a combustor devoid of minor holes in either the inner or outer liner when operated at overall fuel-air ratios of 0.015, 0.025 and 0.032. The analyses also predicted that the NOx reduction potential of the inventive combustor would be largely insensitive to differences in the air pressure in the outer plenums 40, 42. For example, at a fuel-air ratio of about 0.025, a 15% difference between the air pressure in the inner and outer plenums 40, 42 resulted in only about a 5% increase in predicted NOx emissions.

Although this invention has been shown and described with reference to a detailed embodiment thereof, it will be understood by those skilled in the art that various changes in form and detail may be made without departing from the invention as set forth in the accompanying claims.

I claim:

1. A combustor for a turbine engine, comprising:
   an outer liner having exactly one row of circumferentially distributed outer combustion air holes penetrating therethrough, the outer holes comprising larger size major outer holes and smaller size minor outer holes circumferentially intermediate neighboring pairs of major outer holes; and
   an inner liner circumscribed by the outer liner and having exactly one row of circumferentially distributed inner combustion air holes penetrating therethrough, the inner holes comprising larger size major inner holes, circumferentially offset from the major outer holes, and smaller size minor inner holes circumferentially intermediate neighboring pairs of major inner holes;
   wherein each liner comprises a support shell, a forward heatshield secured to a forward portion of the support shell and an aft heatshield secured to an aft portion of the support shell.

2. The combustor of claim 1 wherein a plurality of impingement cooling holes penetrates each support shell and a plurality of film cooling holes penetrates each heatshield.

3. A combustor for a turbine engine, comprising:
   an outer liner having exactly one row of circumferentially distributed outer dilution air holes penetrating therethrough, the outer dilution air holes comprising larger size major outer holes and smaller size minor outer holes circumferentially intermediate neighboring pairs of major outer holes;

an inner liner circumscribed by the outer liner and cooperating therewith to define an annular combustion chamber, the inner liner having exactly one row of circumferentially distributed inner dilution air holes penetrating therethrough, the inner dilution holes comprising larger size major inner holes, circumferentially offset from the major outer holes, and smaller size minor inner holes intermediate pairs of the major inner holes; and a combustor front end assembly serving as the exclusive vehicle for introducing primary combustion air into the combustion chamber;

wherein each liner comprises a support shell, a forward heatshield secured to a forward portion of the support shell and an aft heatshield secured to an aft portion the support shell.

4. The combustor of claim 3 wherein a plurality of impingement cooling holes penetrates each shell and a plurality of film cooling holes penetrates each heatshield.

5. A combustor for a turbine engine, comprising:

an outer liner having a single row of equiangularly distributed, outer dilution air holes penetrating therethrough, the holes of the outer row comprising larger diameter major holes circumferentially alternating with smaller diameter minor holes; and an inner liner circumscribed by the outer liner and cooperating therewith to define an annular combustion chamber, the inner liner having a single row of equiangularly distributed inner dilution air holes penetrating therethrough, the inner row of holes being substantially axially aligned with the outer row of holes and comprising larger diameter major holes circumferentially alternating with smaller diameter minor holes, the major inner holes being circumferentially aligned with the minor outer holes;

a hood extending radially between forward ends of the inner and outer liners;

a guide assembly also extending radially between the forward ends of the liners; and a fuel injector projecting through the hood and the guide assembly, the hood, guide assembly and fuel injector having passageways serving as the exclusive vehicle for delivering primary combustion air to the combustion chamber.

* * * * *